US005153984A

United States Patent [19]

Beetz et al.

[11] Patent Number: 5,153,984

[45] Date of Patent: Oct. 13, 1992

[54] TOOL FOR CRIMPING A DOUBLE CONNECTION OF A CONNECTOR TO A CONDUCTOR AND TO INSULATION

[75] Inventors: Horst Beetz, Stadtallendorf; Kurt Battenfeld, Ebsdorfergrund, both of Fed. Rep. of Germany

[73] Assignee: Werkzeung zum Crimpen Einer Doppelverbindung eins Verbinderswezag GmbH, Stadtallendorf, Fed. Rep. of Germany

[21] Appl. No.: 732,635

[22] Filed: Jul. 19, 1991

[30] Foreign Application Priority Data

Jul. 23, 1990 [DE] Fed. Rep. of Germany ....... 4023337

[51] Int. Cl.[5] ............................................. B23P 19/00

[52] U.S. Cl. ........................................ 29/751; 29/753; 81/424

[58] Field of Search .................... 29/751, 753; 81/421, 81/422, 424; 72/410

[56] References Cited

U.S. PATENT DOCUMENTS

| | | | |
|---|---|---|---|
| 2,900,854 | 8/1959 | Werner | 81/422 |
| 3,410,129 | 11/1968 | Werner | 72/410 |
| 4,790,068 | 12/1988 | Sato | 72/410 |
| 4,825,682 | 5/1989 | Drav et al. | 29/751 |
| 4,926,685 | 5/1990 | Shannon, Sr. | 72/410 |

FOREIGN PATENT DOCUMENTS

| | | | |
|---|---|---|---|
| 156168 | 10/1985 | European Pat. Off. | 29/751 |

*Primary Examiner*—P. W. Echols

*Attorney, Agent, or Firm*—Hopkins & Thomas

[57] ABSTRACT

A tool for crimping a double connection of a connector to a conductor on the one hand and to insulation on the other hand comprises a tool head (1) having a frame (3, 4), a pressing jaw axially stationary on the frame and a pressing jaw axially guided on the frame. A drive (2) is provided for the axially guided pressing jaw, the axially stationary pressing jaw having at least two anvil plates (7, 6) provided with working profiles (24, 25) and the axially guided pressing jaw having at least two associated punch plates (32, 29) provided with working profiles (33). The two cover plates (3, 4), which are spaced apart from one another, form the frame and are provided with parallel aligning surfaces (22) for at least one of the punch plates (32) and at least one at the anvil plates (7). At least one of the punch or anvil plates (7) associated with the aligning surfaces is mounted on the other punch or anvil plate (6) for pivoting about an axis (8) extending at right angles to the principal plane in which the frame extends. In the region of a second edge the anvil plate (7) carries at least one additional working profile (25), which has a different shape from the working profile (24) on the first edge.

10 Claims, 4 Drawing Sheets

TOOL FOR CRIMPING A DOUBLE CONNECTION OF A CONNECTOR TO A CONDUCTOR AND TO INSULATION

FIELD OF THE INVENTION

The invention relates to a tool for crimping a double connection of a connector to a conductor on the one hand and to insulation on the other hand.

BACKGROUND OF THE INVENTION

Crimping tools for crimping a double connection generally comprise a tool head having a frame, a pressing jaw axially stationary on the frame and a pressing jaw axially guided on the frame, and further comprising a drive for the axially guided pressing jaw, the axially stationary pressing jaw having at least two anvil plates provided with working profiles and the axially guided pressing jaw having at least two associated punch plates provided with working profiles, and the frame having two cover plates spaced apart from one another and provided with parallel aligning surfaces for at least one of the punch plates and at least one of the anvil plates. Tools of this kind are used for crimped connections of a connector, for example a plug type connector of deformable metal, and the end of a cable comprising a conductor and insulation. For this purpose on the one hand a conductor claw of the connector is joined to the cable conductor and on the other hand an insulation claw of the connector is joined to the cable insulation. Tools of this kind may be provided with a manual drive, so that they are usually in the form of pliers provided with two handles adapted to pivot oppositely to one another. A drive of this kind may contain a toggle joint or a cam mechanism. More extensive mechanization may provide an electric motor or a pneumatic cylinder or similar drive means designed and arranged in each case to move the axially guided pressing jaw.

BACKGROUND OF THE INVENTION

A tool of the kind defined at the beginning is known from German Patent Specification 34 11 397. There, a tool head is also provided which has a frame, a pressing jaw axially stationary on the frame and a pressing jaw axially guided on the frame. Both the frame and the pressing jaws are here produced by the plate construction method, that is to say they are composed of a plurality of plates which can be manufactured simply by a stamping or grinding process, in order in this way to form total working profiles which are undercut relative to the pressing jaws. The stationary pressing jaw cooperates with the axially guided pressing jaw and the working profiles provided in each jaw are associated with one another. Because of the double pressing in the region of the conductor of the cable, on the one hand, and in the region of the insulation of the cable on the other hand, it is necessary for the working profiles to be adapted to the existing and the desired geometrical conditions of the cable on the one hand and of the connector on the other hand. For a double connection of a specific cable and a specific connector the working profiles must have a geometrical shape adapted thereto. Up to a certain extent it is also possible for cables and connectors of a different geometrical shape to be pressed with a tool of this kind, provided that the difference in shape is not too great. However, starting from a certain degree of difference it is essential that different working profiles should be kept ready in the pressing jaws for different diameters of the conductors, the insulation and/or the connectors. It is thus known here for the pressing jaws to be equipped in each case with a plurality of selectively utilizable working profiles. The number of these working profiles which can usefully be accommodated in a tool of this kind, for example pliers, without making the pliers excessively large and therefore also heavy so that the tool becomes impossible to operate, is limited.

Thus hand pliers of similar construction are known in which three different working profiles are provided on the pressing jaws in order to allow for different ratios of the diameter of the insulation to that of the conductor of the cable. Since in any case a cable usually has a relatively small diameter, attaining at most the size of a few millimeters, with a triple arrangement of working profiles a hand tool which is simple and safe to operate is still obtained. Nevertheless, the working profiles which can be accommodated are often not sufficient to allow for a large number of different diameter ratios, such as may occur at a workplace for crimped connections. In such cases it is then necessary to make a plurality of tools for use at the workplace, in order finally to have available the large number of working profiles required for use in each particular case, so that the work can be done appropriately. It is however then complicated and timeconsuming to change and to use the appropriate tool in each case. There are even cases where it is required to connect two different cables in which the diameters of the two conductors are the same but the diameters of the two insulations are different. Different diameter ratios thus occur in such cases, which as a rule also necessitate the use of different working profiles.

From German Published Patent Specification 21 49 167 a pressing tool of a rather different type is known, which nevertheless is also used for pressing cables and connectors. The frame is here produced in a C-shape by the plate construction method and has a fixed handle associated with a movable handle used to operate an axially guided pressing jaw. The pressing jaws are not made by the plate construction method, but are one-piece shaped parts of suitable configuration, which are often in the form of precision castings. These pressing jaws are detachably mounted on the tool head, so that they are replaceable or are interchangeable with pressing jaws of different shapes. This exchangeability is intended to make it possible on the one hand to replace worn pressing jaws and on the other hand to change over to a different diameter ratio. In a workplace where crimped connections have to be made with frequently changing diameter ratios, this changing of the pressing jaws is burdensome and economically unacceptable per se. It is therefore also already known for the pressing jaw mounted stationary on the C-shaped frame to be arranged in the form of a rotatable turret head and to be equipped with a plurality of working profiles. This pressing jaw is rotatable about a vertical axis at right angles to the principal plane in which the frame extends, while the various working positions can be locked by means of an engageable stop. In the different positions of use of the stationary pressing jaw the entire stationary pressing jaw is thus here turned, so that the entire profiling of the working profile is in each case changed. With this construction of the stationary pressing jaw which is rotatable as a whole it is not possible to use a limiter slide, as is required for suspending a connector and for use as a stop for the insulation of the cable which is to be crimped, for the purpose of ensuring the correct relative positions of the cable and the connector during the crimping operation. In addition, this pressing jaw has the disadvantage that it is not possible for different diameter ratios to be taken into account in optimum manner, for example when the conductor diameters are the same, since for each diameter ratio a complete working profile must nevertheless be provided in each case. The number of working profiles which can be accommodated on a turret head of this kind is also not particularly great. Moreover, it is a disadvantage that for every change of the diameter ratio a rotation of the pressing jaw is required in any case.

The problem underlying the invention is that of so improving a tool of the type defined at the beginning that the number of different working profiles for different diameter ratios of the insulation and conductors and also of the connectors is increased and the fitting of a limiter slide has in principle no disturbing effect.

SUMMARY OF THE INVENTION

According to the invention this is achieved in that at least one of the punch or anvil plates associated with the aligning surfaces is mounted on the other punch or anvil plate for pivoting about an axis extending at right angles to the principal plane in which the frame extends, and in the region of a second edge carries at least one additional working profile which has a different shape from that of the working profile on the first edge.

In the tool according to the invention no use is made of one-piece pressing jaws, but each pressing jaw, whether it is the axially stationary jaw or the axially guided and therefore movable jaw, is composed of at least anvil plates or punch plates respectively. Moreover, three punch or anvil plates are often used at this point. The first or one punch or anvil plate serves to make the connection of the connector to the insulation. The second or other anvil or punch plate serves to make the connection between the cable conductor and the connector. The third anvil or punch plate, if provided, can serve to support the connector during the crimping operation. Because of the plate construction method employed by the invention, not only is the advantage achieved that these pressing jaws can be produced by simple stamping and grinding processes, although the pressing jaw composed of a plurality of plates then has corresponding undercuts, but it is here surprisingly also made possible, when there are different diameter ratios and, for example, identical conductor diameters, to combine different first punch or anvil plates with one and the same second punch or anvil plate. The pivotally mounted punch or anvil plate forms so to speak a turnplate which is simple to handle. The generic construction of the tool makes it immediately possible to dispose a plurality of working profiles in the region of an edge of the punch or anvil plate for selective use. The advantage is thus achieved that for determined number of working profiles which are disposed side by side and are selectively utilizable it is not even necessary to pivot the punch or anvil plate, and that this pivoting is effected only when crimping with different diameter ratios is needed. This is possible because, through the special construction of the tool, parallel aligning surfaces are provided on the frame to enable the respective punch or anvil plates to be supported over a large area, so that even working profiles located outside a center axis can be used. In addition, it is an advantage that the aligning surfaces, which are in any case needed for the axial guidance of the movable punch plate, are also used as a stop to prevent free pivotability of the punch or anvil plate in the position of use. Since the pressing jaws are divided into the individual punch or anvil plates, it is also immediately possible to dispose a limiter slide between two such plates, this limiter slide needing in addition to be mounted for sliding against spring pressure in order not to disturb the crimping operation.

The pivotally mounted punch or anvil plate may be held captive on the other punch or anvil plate. The punch or anvil plate can thus be made disengageable and pivotable without this plate being separated from the tool head during normal operation. In this way it is ensured that the working profile combination needed in each case can be adjusted.

The pivotally mounted punch or anvil plate may have a grip sleeve, while a stub shaft is disposed on the other punch or anvil plate. A spring is supported between the pivotally mounted punch or anvil plate and a thickened end of the stub shaft. The pivotally mounted punch or anvil plate is thus made captive in the working position by means of the spring and so held in its correct position. For pivoting purposes it is moved in the axial direction of the stub shaft against the force of the spring, pivoted and reinserted, the aligning surfaces on the frame serving at the same time as stops to secure it in the position of use.

The working profiles on the pivotally mounted punch or anvil plate may be disposed on two opposite edges, so that in conjunction with the parallel aligning surfaces two positions of use, obtained by pivoting through 180°, are provided for the punch or anvil plate. As a rule it is sufficient to make use of pivotability of 180° and to provide two edges with working profiles, while the remaining two edges come into contact with the parallel aligning surfaces. It is however also possible, for example, for all four edges of an anvil plate to be provided with working profiles in order to obtain four positions of use disposed in each case at 90° to one another. The number of working profiles depends on the shape of the profiles and on the diameter ratios to be covered.

The pivotally mounted punch or anvil plates may have, on the edges not provided with working profiles, coacting surfaces associated with the aligning surfaces on the coacting plate. These coacting surfaces serve to align the anvil plate and to secure it against turning during the crimping operation. On a punch plate they serve for axial guidance in conjunction with the aligning surfaces. The coacting surfaces need not necessarily extend over the entire length of the edge.

One or both cover plates of the frame may be U-shaped and have an opening in the region of the pivotally mounted punch or anvil plate. Stability of the frame is achieved by riveting in the plate construction technique. In this respect there is no objection to giving one or both plates a U-shape with an opening. The provision of the opening enables the tool head to be constructed at the anvil plate, that is to say projecting forwards only slightly. This is advantageous in respect of operation when space is restricted.

The pivotally mounted punch or anvil plate may be disposed on the outside in relation to the principal plane in which the frame extends, while the other punch or anvil plates are themselves disposed without guidance between the cover plates. The punch or anvil plate which is provided with the multiple working profiles selectively utilizable after pivoting is always disposed on the outside, in order to be easily accessible for a pivoting operation. It may be disposed on the upper face and/or underside of the pliers or tool head.

Between the pivotally mounted anvil plate and the other anvil plate a limiter slide, mounted for sliding against spring pressure, may be provided for the insulation. This limiter slide is very important for operation. On the one hand it enables the connector to be suspended on the limiter slide with the gap between the conductor claw and the insulation claw, and thus makes it possible to obtain a reproducible relative position of the connector in the tool head. At the same time, this limiter slide is provided with edge openings, particularly in the form of slots, which serve as a stop for the insulation when the cable end is inserted into the tool head ready to receive it. The limiter slide thus serves two purposes. On the other hand, the limiter slide must not obstruct the correct crimping operation. To this end it must be mounted to yield resiliently, to be precise, between the two anvil plates associated with one another.

In order to facilitate operation, the grip sleeve on the pivotally mounted punch or anvil plate may be provided with knurling, milling or the like.

In the region of an edge of the punch and anvil plate a plurality of working profiles may be provided side by side, in which case however the possible combinations are limited by their arrangement. As a rule these combinations are nevertheless sufficient to allow for a plurality of diameter ratios.

BRIEF DESCRIPTION OF THE DRAWINGS

Advantageous embodiments of the invention are described below and illustrated in the accompanying drawings, in which.

DETAILED DESCRIPTION

Figure 1:
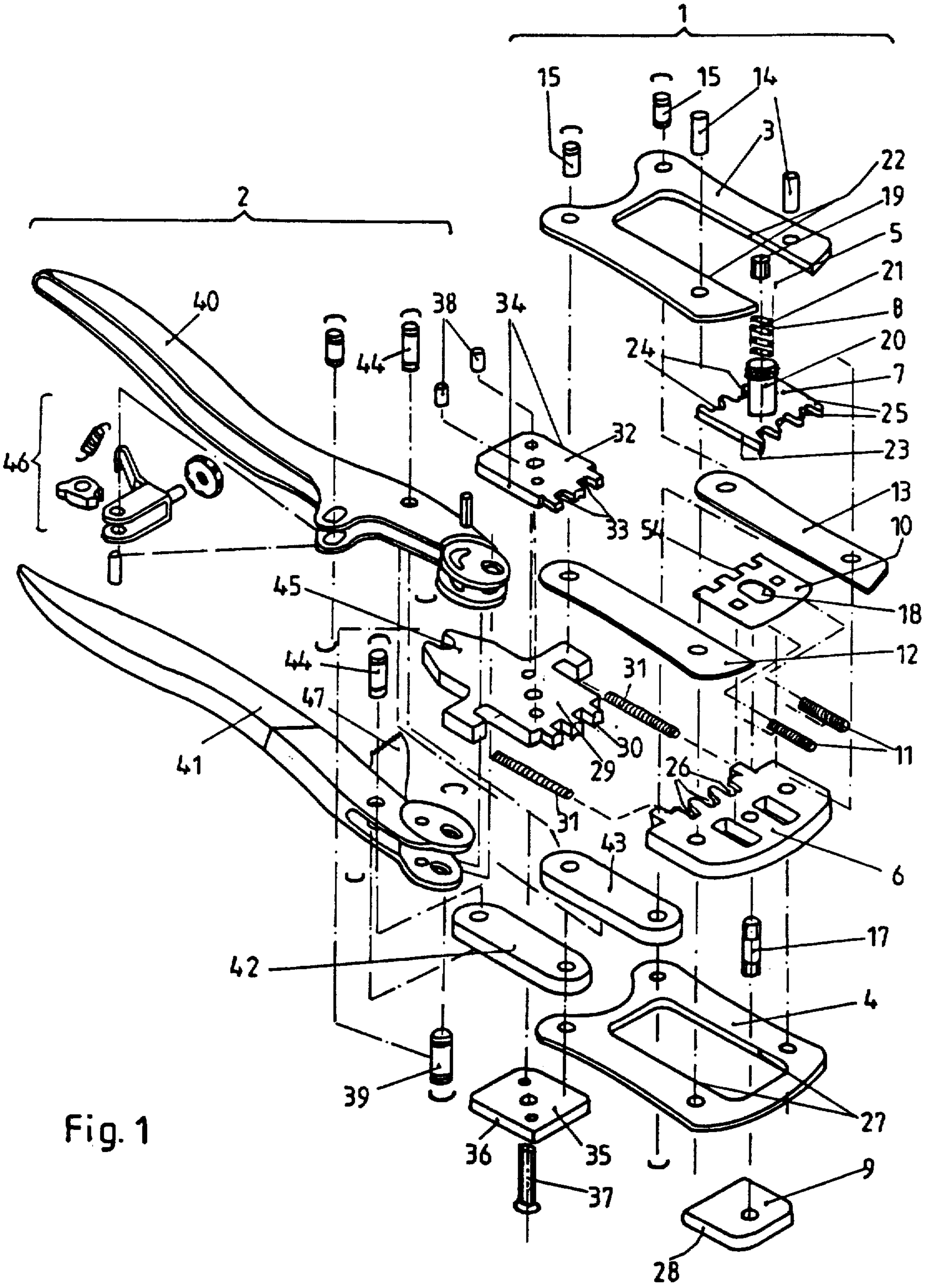
FIG. 1 is an exploded sketch of the tool in the form of hand pliers, with its components.

In FIG. 1 all the components of the tool of a first embodiment are shown. One set of these components forms a tool head 1. Other components form a drive 2. The present invention relates essentially to the construction of the tool head 1 with its components, while the drive 2 is here, solely by way of example, designed in the form of a manually operated pliers drive. A pneumatic drive or an electric motor drive could instead also be provided.

The tool head 1 comprises a top (front) cover plate 3 and a bottom cover plate (4), which together with appropriate rivets and other parts form a frame 3, 4. The bottom cover plate 4 has a continuous closed edge, while the top cover plate 3 is U-shaped and has an opening 5. An anvil plate 6 is joined to the bottom cover plate 4 and other parts and forms an anvil plate 6 which is immovable, that is to say stationary, relative to the frame 3, 4. Another (second) anvil plate 7 is provided, which is mounted on the assembled tool head for pivoting about an axis 8. Finally, a third anvil plate 9 is provided which fits into a recess in the bottom cover plate 4. The anvil plates 6, 7, 9 form in the assembled state a stationary pressing jaw 6, 7, 9. Between the anvil plates 6 and 7 is disposed a limiter slide 10 in the form of a thin sheet metal plate, which is mounted for limited axial sliding against the pressure of springs 11. In order to make up the height between the cover plates 3 and 4 in the region of the limiter slide, shim plates 12 and 13 are provided, the thickness of the material of which coincides with that of the limiter slide 10. Rivets 14 and pivot pins 15 or corresponding connecting members serve to hold the parts together. The anvil plates 6, 7, and 9 are held together by a stub shaft 17, which with the aid of a screw thread is screwed into the anvil plate 9, passes through a bore in the anvil plate 6 and through a slot 18 in the limiter slide 10, and finally forms the axis 8 about which the anvil plate 7 is pivotally mounted. At the end of the stub shaft 17 a screw thread is also provided, onto which a screw cap 19 can be screwed, thus so to speak forming a thickened end of the stub shaft 17. A grip sleeve 20 is joined to the pivotable anvil plate 7 and may be in the form of a hollow cylinder screwed by means of a screw thread into the anvil plate 7. A spring 21 is received in a space between the stub shaft 17 and the grip sleeve 20 and bears at one end against the screw cap 19 and at the other end against the anvil plate 7.

The top cover plate 3 is provided with aligning surfaces 22 which are disposed parallel to its longitudinal axis and against which the movable anvil plate 7 bears by corresponding coacting surfaces 23. In this way the pivotable anvil plate 7 is secured against turning. The anvil plate 7 is roughly rectangular in shape. The two edges of the anvil plate 7 which do not constitute the coacting surfaces 23 are each provided with one or more working profiles 24, 25—here three working profiles 24 and three working profiles 25 are shown—the shape of which depends in detail on the geometrical conditions, in the region of the insulation, of the connector which is to be crimped. The anvil plate 6 has associated working profiles 26, which however are disposed on one side only because this anvil plate 6 is not pivotable but is mounted stationary on the frame 3, 4. The working profiles 26 are adapted to the geometrical conditions of the crimping in the region of the conductor of the cable. It can already be seen that in the relative position illustrated the working profiles 24 are combined with the working profiles 26, so that if in each case three working profiles 24 and three working profiles 26 are provided, three different ratios between the diameter of the insulation and the diameter of the conductor can here be covered. The working profiles 25 on the pivotable anvil plate 7 are adapted to other insulation diameters. After the anvil plate 7 has been pivoted through 180°, the working profiles 25 are then associated with the working profiles 26, so that here three more diameter ratios are covered, of course with conductor diameters or conductor diameter ranges corresponding in that respect.

While the anvil plate 6 is disposed in the space between the cover plates 3 and 4, that is to say therefore secured against rotation only by means of the rivets 14, the bottom cover plate 4 also has aligning surfaces 27, associated with coacting surfaces 28 on the anvil plate 9, whereby the anvil plate 9 is given its fixed seat, secured against rotation, in the bottom cover plate 4. The anvil plate 9 may likewise be provided with working profiles or support profiles for a connector. These, however, are not shown in the drawings.

A punch plate 29 is provided which is equipped with working profiles 30 associated with the working profiles 26 of the anvil plate 6. Cooperation of the working profiles 26 and 30 brings about the crimping in the conductor region of a connector. The punch plate 29 is mounted for axial movement between the cover plates 3 and 4 and is not itself guided even in the axial direction, inasmuch as it has no guiding surfaces. It is supported on the stationary anvil plate 6 only by means of springs 31 which have a restoring function. Associated with the punch plate 29 is a punch plate 32 provided with working profiles 33, which are associated with the working profiles 24 and 25 of the anvil plate 7. The punch plate 32 is in addition provided with guide surfaces 34, which are associated with the aligning surfaces 22 of the top cover plate 3. Another punch plate 35 is provided, which similarly to the anvil plate 9 may be provided with working profiles (not shown) but otherwise has guide surfaces 36, which are associated with the aligning surfaces 27 of the bottom cover plate 4, so that by means of the guide surfaces 34 and 36, in conjunction with the aligning surfaces 22 and 27, a slide guide for the three punch plates 29, 32 and 35 is obtained, the latter together forming a movable pressing jaw 29, 32, 35. Thus as plates 32 and 35 are guided, plate 29, as part of the jaw, is also guided. The punch plates 29, 32 and 35 are joined together by a threaded pin 37 and supported against one another by means of fitting pins 38 and thus secured against rotation. The working profiles 33 of the punch plate 32 are associated with the working profiles 24 and 25 of the pivotally mounted anvil plate 7, so that at this point the insulation of the cable is crimped.

The drive 2 has two handles 40 and 41 which are symmetrically pivotable oppositely to one another about a pivot pin 39. Connecting rods 42 and 43 are supported at one end on the pivot pins 15 and at the other end are connected by means of pivot pins 44 to the handles 40 and 41. The punch plate 29 is supported, against the force of the springs 31, on the pivot pin 39 by an open indentation 45 on its edge, so that it can be seen that, when the two handles 40 and 41 are compressed, the pivot pin 39 and, therefore, the axially movable pressing jaw consisting of the punch plates 29, 32 and 35 is moved forwards. A ratchet mechanism 46 having a toothed comb 47 is constructed in a known manner and is provided in order to ensure that the pliers can be reopened only after being completely closed whereby the required crimping pressure is achieved.

Figure 2:
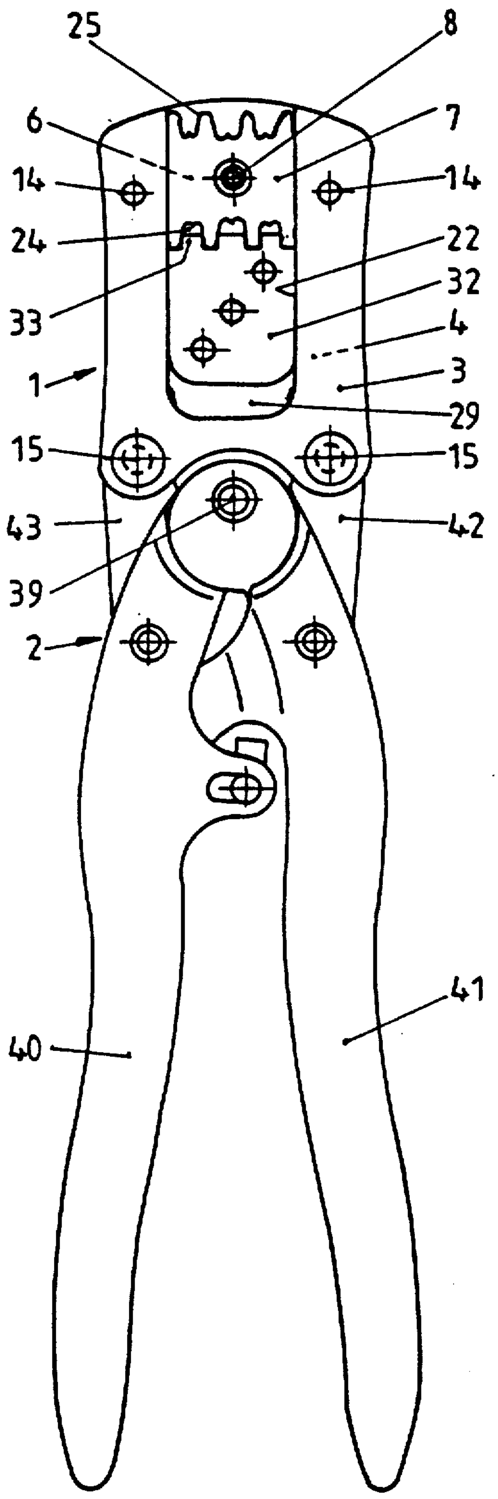
FIG. 2 is a plan view of the tool shown in FIG. 1 in the assembled state showing the reaching of the pressing position.

FIG. 2 shows a plan view of the pliers comprising the tool head 1 and the drive 2, the pliers being shown in the crimping position, but without a connector having been inserted. It can be seen that the anvil plate 7 is situated with its working profiles 24 facing the working profiles 33 of the punch plate 32. The working profiles 25 are out of action.

Figure 3:
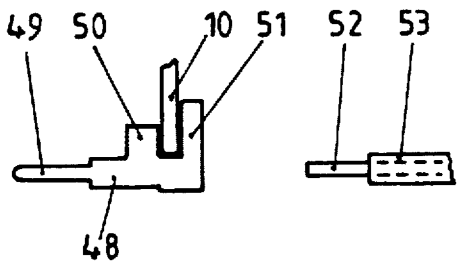
FIG. 3 is a schematic side view of a connector and a cable end.

FIG. 3 shows in side view a connector 48, that is to say a shaped metal part which at its front end may, for example, carry a pin 49. A conductor claw 50 and an insulation claw 51 are provided, which are in each case in the form of two extensions. The limiter slide 10 is shown, broken away, in its relative position. A cable comprises a conductor 52 and an insulation 53, the conductor 52 usually consisting of metal and the insulation 53 of plastic material. The cable is to be crimped to the connector 48 in such a manner that double crimping occurs. On the one hand the conductor 52 is crimped to the conductor claw 50, and on the other hand the insulation 53 is (simultaneously) crimped to the insulation claw 51. The association of the respective working profiles can be seen. Since there are a large number of cables an both the conductors 52 and the insulations 53 have various diameters, there are quite a number of diameter ratios which have to be covered by the working profiles 24, 25, 33, 26, 30. From FIG. 3 it can also be seen how the limiter slide 10 serves to insert the connector 48 and how it provides a reproducible position for the connector 48 by engaging in the space between the conductor claw 50 and the insulation claw 51. At the same time the limiter slide 10 also forms, by its recesses 54 open on its edge (FIGS. 1 and 4), a stop for the insulation 53 when the cable is inserted into the tool head 1 equipped with the connector 48.

Figure 4:
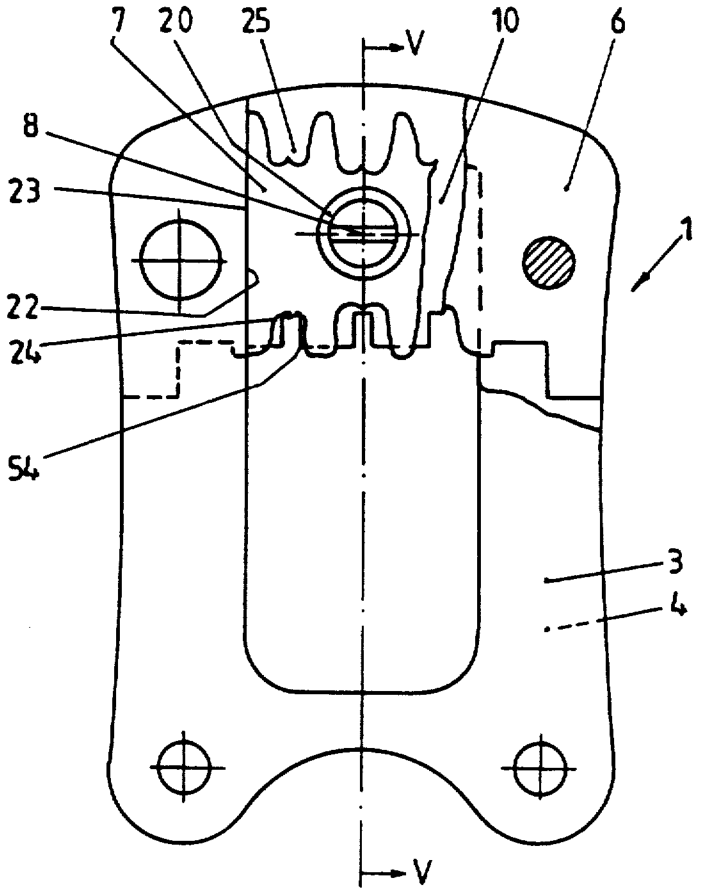
FIG. 4 is a plan view, partly broken away, of a tool head, the punch plates being omitted.
Figure 5:
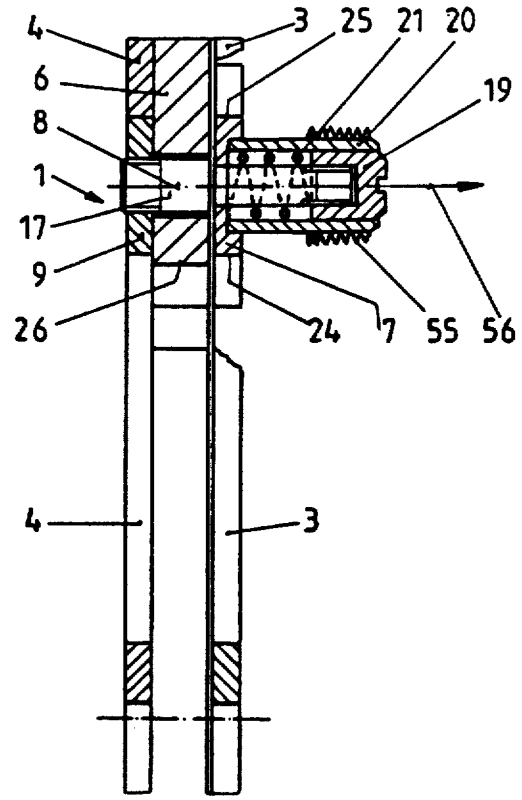
FIG. 5 is a section on the line V—V in FIG. 4.

FIGS. 4 and 5 elucidate once again the construction of the tool head 1, which is shown by itself with the parts essential to the invention. Only the frame 3, 4 with the stationary anvil plate 6 is shown, while the anvil plate 7 mounted for pivoting about the axis 8 is shown partly broken away. The plate 7 is provided with the working profiles 24 and 25. Under the anvil plate 7 is situated the limiter slide 10, with the recesses 54 open at its edge. Under the limiter slide 10 the anvil plate 6 can be seen. Under the latter is situated the anvil plate 9. It can be seen particularly clearly in FIG. 5 how the anvil plate 7 is mounted for pivoting about the axis 8. It is held in the working position by the spring 21, while it is secured against rotation through the fact that the coacting surfaces are supported on the aligning surfaces of the top cover plate 3. The grip sleeve 20 is expediently provided on the outside with knurling, milling or the like 55, which enables it to be easily gripped and pulled against the force of the spring 21. The anvil plate 7 is by this means lifted out in the direction of the arrow 56. In the raised position it is situated outside the contour of the upper cover plate 3 and can thus be pivoted through 180°. The anvil plate 7 is then allowed to snap back between the aligning surfaces.

Figure 6:
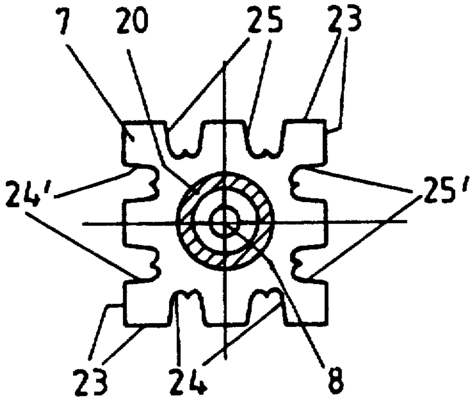
FIG. 6 is a plan view of a second embodiment of a pivotable anvil plate.

FIG. 6 shows another embodiment of the anvil plate 7. The latter has here a square contour and in the region of all its four edges is provided with working profiles 24, 25, 24', 25', so that here four different relative positions, turned 90° relative to each other, can be used. The remaining surface parts on the edges then form the respective coacting surfaces 23.

FIG. 6 shows an embodiment of the anvil plate 7. A similar arrangement could be obtained if the anvil plate 9 were pivotally mounted. The punch plate 32 could also be of similar construction if such a punch plate had to be equipped with indented working profiles, as indicated in the case of the indented working profiles 24 and 25 in contrast to the projecting working profiles 33 or 30.

Figure 7:
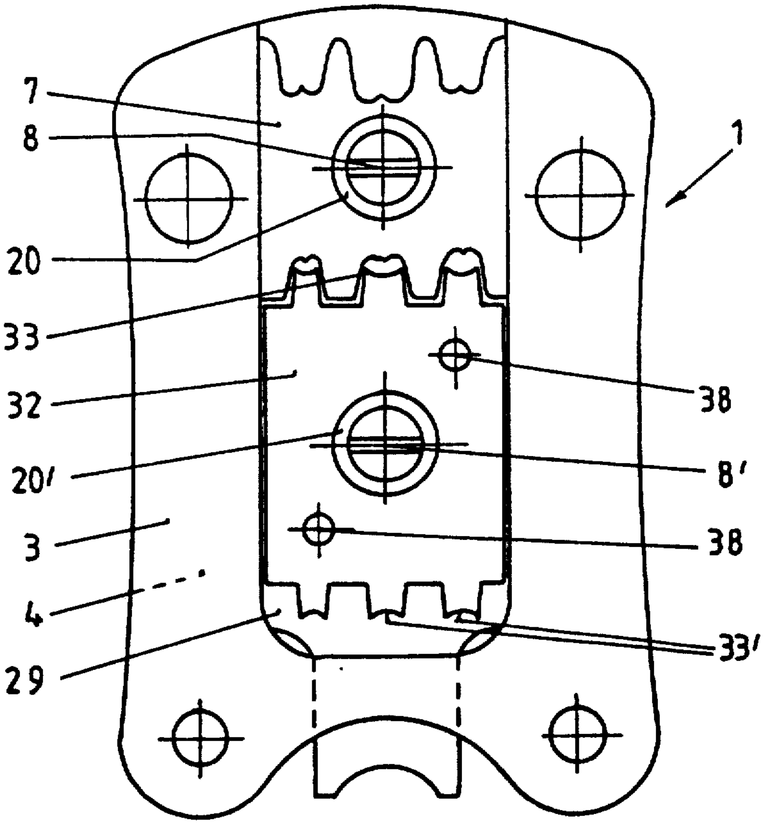
FIG. 7 is a plan view of a tool head with a pivotable anvil plate and a pivotable punch plate.

FIG. 7 is similar to FIG. 4, but here the movable pressing jaw composed of the punch plates 32, 29 and optionally 35 is additionally shown. The invention here has so to speak two embodiments, namely in the one case for the punch plate 32 and in the other case for the anvil plate 7. The application of the invention is finally not restricted to the front side of the tool head 1 which is shown in FIGS. 4 and 7, but can also be applied to the underside region, that is to say in connection with the anvil plate 9 and the punch plate 35, if the construction of the connector 48 requires this or makes it appear expedient. The number of possible combinations nations is then further increased. In this case the punch plate 32 also has a grip sleeve 20' mounted for pivoting about the axis 8'. The punch plate 32 is here equipped with working profiles 33 and 33'.

| List of references | |
|---|---|
| 1 - Tool head | 29 - Punch plate |
| 2 - Drive | 30 - Working profile |
| 3 - Top cover plate | 31 - Spring |
| 4 - Bottom cover plate | 32 - Punch plate |
| 5 - Opening | 33 - Working profile |
| 6 - Anvil plate | 34 - Guide surface |
| 7 - Anvil plate | 35 - Punch plate |
| 8 - Axis | 36 - Guide surface |
| 9 - Anvil plate | 37 - Threaded pin |
| 10 - Limiter slide | 38 - Fitting pin |
| 11 - Spring | 39 - Pivot pin |
| 12 - Shim plate | 40 - Handle |
| 13 - Shim plate | 41 - Handle |
| 14 - Rivet | 42 - Connecting rod |
| 15 - Pivot pin | 43 - Connecting rod |
| 16 - Threaded pin | 44 - Pivot pin |
| 17 - Stub shaft | 45 - Indentation |
| 18 - Slot | 46 - Ratchet mechanism |
| 19 - Screw cap | 47 - Toothed comb |
| 20 - Grip sleeve | 48 - Connector |
| 21 - Spring | 49 - Pin |
| 22 - Aligning surface | 50 - Conductor claw |
| 23 - Coacting surface | 51 - Insulation claw |
| 24 - Working profile | 52 - Conductor |
| 25 - Working profile | 53 - Insulation |
| 26 - Working profile | 54 - Recess |
| 27 - Aligning surface | 55 - Knurling |
| 28 - Coacting surface | 56 - Arrow |

We claim:

1. Tool for crimping a double connection of a connector to a conductor and to insulation, comprising a tool head having a frame, a pressing jaw axially stationary on the frame and a pressing jaw axially guided on the frame, and further comprising a drive for the axially guided pressing jaw, the axially stationary pressing jaw having at least two anvil plates provided with working profiles and the axially guided pressing jaw having at least two associated punch plates provided with working profiles, and the frame having two cover plates spaced apart from one another and provided with parallel aligning surfaces for at least one of the punch plates and at least one of the anvil plates, characterized in that at least one of the punch or anvil plates (7, 9, 32, 35) associated with the aligning surfaces (22, 27) is mounted on the other punch or anvil plate (6, 29) for pivoting about an axis (8) extending at right angles to the principal plane in which the frame (3, 4) extends, and in the region of a second edge carries at least one additional working profile (25) which has a different shape from that of the working profile (24) on the first edge.

2. Tool according to claim 1, characterized in that the pivotally mounted punch or anvil plate (7, 32) is held captive on the other punch or anvil plate (6, 29).

3. Tool according to claim 2, characterized in that the pivotally mounted punch or anvil plate (7, 32) has a grip sleeve (20, 20'), in that a stub shaft (17) is disposed on the other punch or anvil plate (6, 29), and in that a spring (21) is supported between the pivotally mounted punch or anvil plate (7, 32) and a thickened end of the stub shaft (17).

4. Tool according to claim 3, characterized in that the grip sleeve (20) is provided with a gripping surface (55).

5. Tool according to claim 1 characterized in that the working profiles (24, 25; 24', 25'; 33, 33') are disposed on two opposite edges so that in conjunction with the parallel aligning surfaces (22, 27) two positions of use, obtained by pivoting through 180°, are provided for the punch or anvil plate.

6. Tool according to claim 5, characterized in that the pivotally mounted punch or anvil plates (7, 32, 9, 35) have, on the edges not provided with working profiles, coacting surfaces (23, 34, 28, 36) associated with the aligning surfaces (22, 27) on the cover plate (3, 4).

7. Tool according to claim 1, characterized in that one or both of the cover plates (3, 4) of the frame are U-shaped and have an opening (5) in the region of the pivotally mounted punch or anvil plate (7, 32, 9, 35).

8. Tool according to claim 1, characterized in that the pivotally mounted punch or anvil plate (7, 32, 9, 35) is disposed on the outside in relation to the principal plane in which the frame (3, 4) extends, while the other punch or anvil plates (6, 29) are themselves disposed without guidance between the cover plate (3, 4).

9. Tool according to claim 1, characterized in that between the pivotally mounted anvil plate (7) and the other anvil plate (6) a limiter slide (10), mounted for sliding against spring pressure, is provided for the insulation.

10. Tool according to claim 1, characterized in that in the region of an edge of the punch and anvil plates a plurality of working profiles (24 or 25 or 33) are provided side by side.

* * * * *

UNITED STATES PATENT AND TRADEMARK OFFICE

CERTIFICATE OF CORRECTION

PATENT NO. : 5,153,984

DATED : October 13, 1992

INVENTOR(S) : Beetz, et al

It is certified that error appears in the above-indentified patent and that said Letters Patent is hereby corrected as shown below:

On the cover page, line [73], change "Werkzeung zum Crimpen Einer Doppelverbindung eins Verbinderswezag GmbH" to --WEZAG GmbH Werkzeugfabrik--.

Signed and Sealed this

First Day of March, 1994

Attest:

BRUCE LEHMAN

*Attesting Officer*

*Commissioner of Patents and Trademarks*